No. 801,583. PATENTED OCT. 10, 1905.
W. E. GARFORTH, R. SUTCLIFFE & W. BUXTON.
COAL CUTTING MACHINE.
APPLICATION FILED OCT. 7, 1904.
2 SHEETS—SHEET 1.
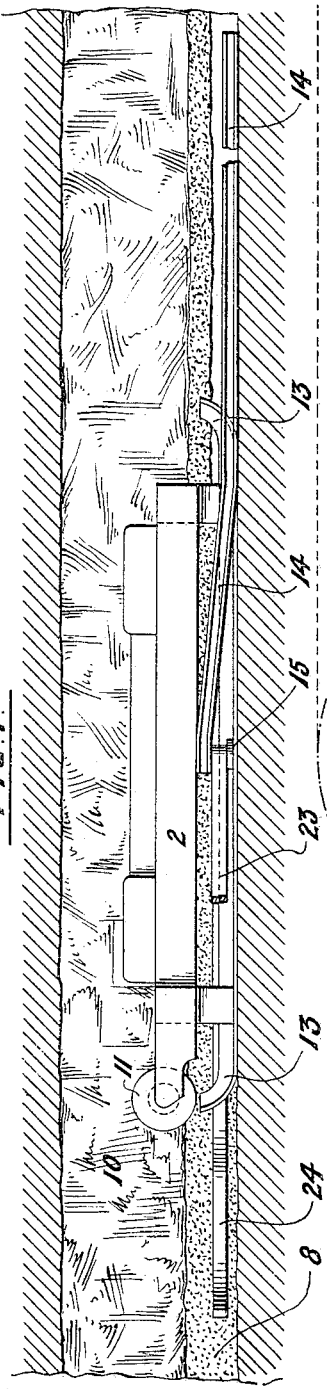
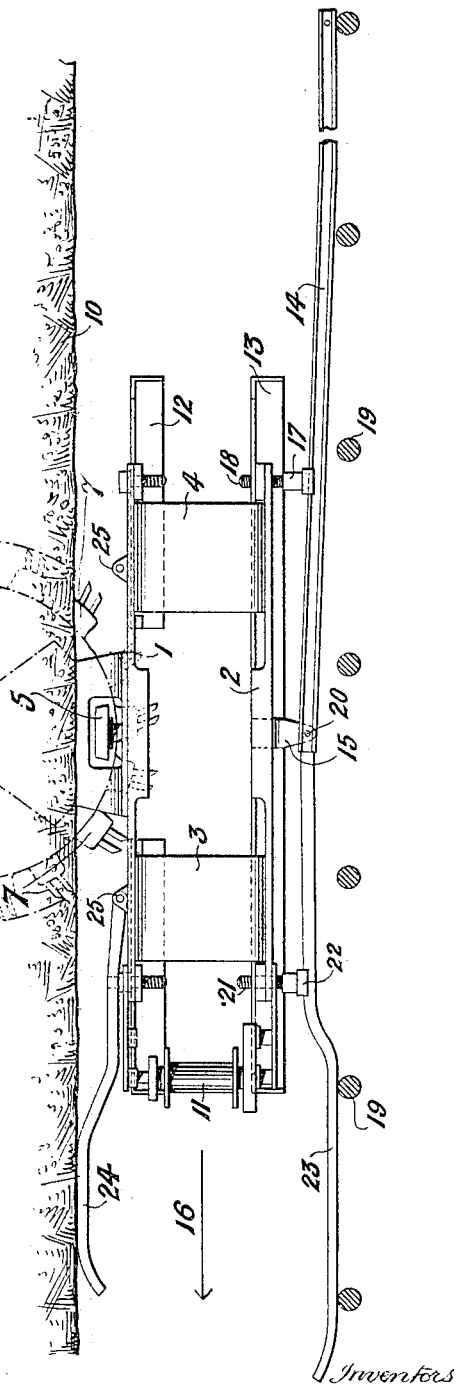

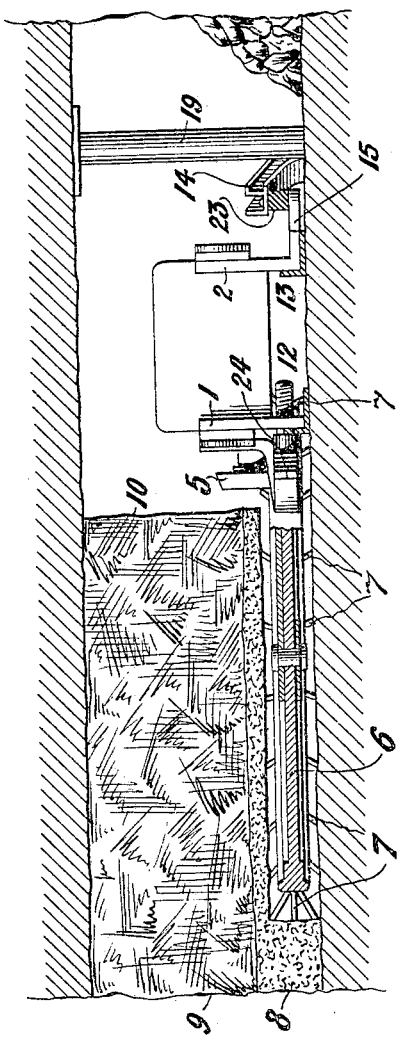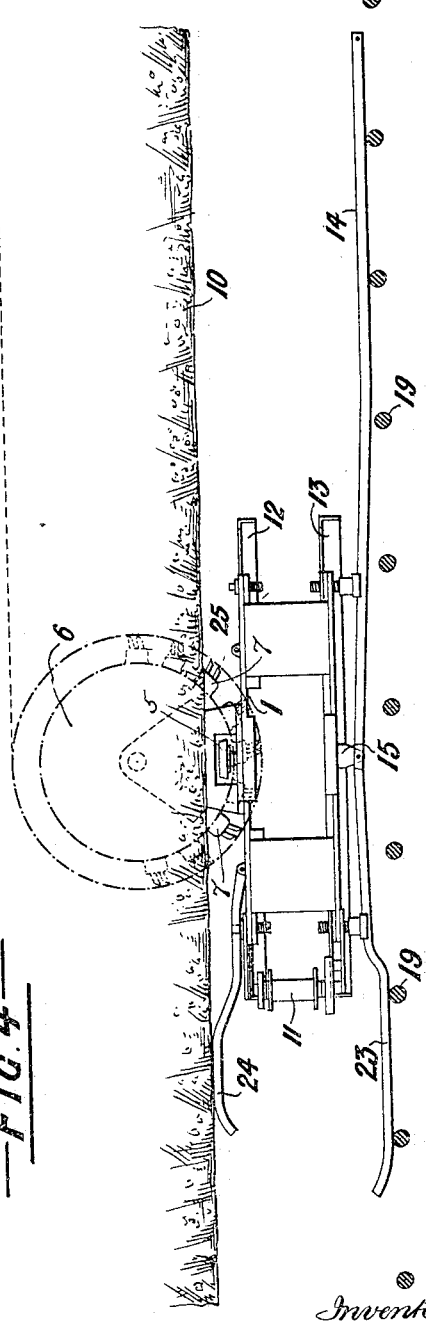

UNITED STATES PATENT OFFICE.

WILLIAM EDWARD GARFORTH, RICHARD SUTCLIFFE, AND WILLIAM BUXTON, OF WAKEFIELD, ENGLAND.

COAL-CUTTING MACHINE.

No. 801,583. Specification of Letters Patent. Patented Oct. 10, 1905.

Application filed October 7, 1904. Serial No. 227,591.

*To all whom it may concern:*

Be it known that we, WILLIAM EDWARD GARFORTH, RICHARD SUTCLIFFE, and WILLIAM BUXTON, subjects of the King of Great Britain, residing at Wakefield, in the county of York, England, have invented certain new and useful Improvements in Coal-Cutting Machines, of which the following is a specification.

To remove coal from mines it is common to undercut—that is, to cut a groove in the dirt immediately beneath the coal-seam and then to break down the coal. For many years machines have been employed for cutting this groove and are known as "long-wall undercutting-machines." The said machines are provided with a cutting device projecting from one side, which consists of a disk on a vertical axis carrying cutting-knives on its periphery, or, instead, some of these machines carry a projecting rotary bar having cutters or an endless chain having cutters mounted on its links. Such machines are generally hauled along the face of the coal by a cable, while simultaneously the cutter-wheel or equivalent acts to cut the groove, and most commonly at the present time the machine is guided in its motion of translation by being fitted with and carried upon flanged wheels running on rails laid on the bed or floor of the mine. In cutting the action of the cutters tends to twist the machine, and the rails and flanged wheels hold it firmly in a straight course; otherwise it would be quickly thrown out of alinement. Now machines so carried and guided—namely, by flanged wheels on rails—present considerable disadvantages in that one or two extra men beyond what is required for working the machine are called upon to attend to the rails, which in practice are generally made in three lengths, so that as the machine is fed forward the men take up those rails over which the machine has passed and attach them to the forward end of the track ready to receive the machine as it advances.

In the early history of long-wall undercutting-machines it was proposed to dispense with the rails and to support the machines on rollers to run directly on the floor of the mine; also, it was proposed instead of the rollers or wheels to employ sleigh-runners, which were to be slid on the floor of the mine. Such propositions introduced the problem of guiding the machine in a straight line and preventing it leaving or being twisted out of its desired path of travel, and several propositions have at different times been made with the object of overcoming this difficulty. For example, it has been proposed to provide rollers on vertical axes or a sleigh-runner at the side of the machine so placed as to bear against the face of the coal, and it has been proposed to provide in combination with such side bearer a longitudinally-placed knife, cutting into the floor of the mine as the machine traveled along. These arrangements are not satisfactory, because if the guides bear only against the face of the coal the machine is free to be forced away from such face, and if a knife-guide is used it entails a considerable loss of power in cutting a groove, as well as not being a reliable guide, its lateral resistance varying with the substance of the floor.

Now in getting coal on the long-wall system temporary props (timbers placed vertically between the roof and floor) are employed on the "goaf" side opposite the coal-face, which props are removed and replaced from time to time as the coal-face recedes, so as to be at a normal distance therefrom, and it has been proposed to employ those props as an abutment for a guide-bar carried on the side of the machine to preserve its line of travel when carried on sleigh-runners or on wheels without rails; but such has not proved successful, because the direct strain and pressure so brought upon the props is liable to displace them, and thereby entails danger to the workers; but otherwise this mode of guiding the machine is satisfactory.

Now the object of the present invention is still to utilize the props on the goaf side for guiding the machine, but to so construct those guide members which are carried by the machine and which are to come into contact with the props that the said members shall act as levers having considerable mechanical advantage in guiding the coal-cutting machine, so that the stability of the said props shall not be endangered. These guiding members, which take the form of guide-bars or fenders, are carried by the machine so that they shall act against the props at some considerable distance away from the ends of the machine, so as thereby to obtain considerable leverage for its guidance, and the said guide-bars extend to such a distance away from the machine that should by any mischance accident happen to the said props the said guide-bars would only displace those which are not close to the workmen and to the machine, and consequently danger is eliminated by the construction of devices according to our invention.

An example of construction of our invention is illustrated in the drawings.

Figure 1 is a longitudinal vertical section of part of the working of a coal-mine with so much of a long-wall undercutting-machine as will be necessary to describe the features of this invention, Fig. 2 being a plan of the same. Fig. 3 is an end elevation of the general mechanism and a section through its supports and through the cutting device shown in Fig. 2, and Fig. 4 a plan view on a smaller scale to show the length of the guide-bars or fenders proportionately to the machine.

The framework of the machine is composed of two longitudinal side plates 1 2 and transverse bearers 3 4, upon which any desired mechanism driven by electricity or air-pressure is carried and which being of any ordinary description is not illustrated in the accompanying drawings, forming no part of this invention. Such motor mechanism drives in the case illustrated a toothed wheel 5, which gives motion to a horizontal wheel 6, carrying upon its periphery a number of sets of cutting-tools, one set of which is indicated at 7 with two of the teeth in the same vertical plane, and this wheel is adapted to cut into the dirt 8 beneath the coal-seam 9, as shown at Fig. 3. Such a machine is drawn along parallel with the face 10 of the coal by means of a cable passed around a winding-drum, such as 11, all as customary with such machines.

The framework of the machine is mounted and carried upon sleigh-runners 12 13, which slide upon the floor of the mine, and therefore must be guided to maintain its proper and true path of travel. In order to do this, according to our invention we employ a long rod carried by the frame of the machine and extending for some distance rearwardly and which we term a "trailing rod," marked 14. This trailing rod 14 is pivoted at one end to a bracket 15, extending from that side of the machine farthest from the coal-face 10, and said rod extends rearward for some distance behind the machine, the latter, as shown in the drawings, being supposed to be traveling in the direction of the arrow 16 at Fig. 2, and the trailing rod 14 is supported away from the frame 2 of the machine by means of a thrust-block 17, located behind the bracket 15. The thrust-block 17 is adjustable outward by a screw 18 and bears against and supports the trailing rod 14 against the props 19, which support the roof of the working.

It will be observed that the trailing rod 14, as shown at Fig. 4, is of such a length and is so bent that it is only in contact with those props 19 which are at some distance in rear of the machine.

Since it would be inconvenient, if not impossible, in the limited space to turn the rod 14 over when the machine has finished its travel in the direction of the arrow 16 preparatory to its return, we connect its end to the bracket 15 by placing one end of the rod 14, in which a hole is formed, over a fixed pin 20, projecting from the bracket 15, and before the machine is returned along its path of travel the rod 14 is removed from its pin, drawn along, and the hole in the other end of the rod (which was previously the rear end) placed over the said pin 20, while the rod 14 is then supported against a second thrust-pin and block 21 22 in the machine, so as again to trail rearwardly.

Pivoted to the bracket 15 is a fender-rod 23, extending in front of the machine and being held out by that thrust-block and screw which is not engaged at the time with the trailing rod 14. This fender 23 only comes in contact with those props which are at the time in front of the machine on the goaf side, and when the travel of the machine is reversed the fender 23 is disconnected, and not being of so great a length as the rod 14 is turned round and so placed at the opposite end of the machine and again traversed forwardly. On the opposite side of the machine against the coal-face we provide a fender-bar 24, pivoted to one of the brackets 25, according to which direction the machine is traveling, so as to extend forwardly and bear against the coal-face or equivalently, as is shown in the drawings, against the shale or dirt immediately beneath the coal-seam. By making this trailing rod 14 extend a sufficient distance rearwardly it will now be understood that owing to the mechanical advantage of a long leverage which the bar has on the machine, which it guides, it does not subject the props against which it bears to those sudden shocks or to strains of such magnitude as they would otherwise receive if the fender-bar were only located at the side of the machine and did not extend to any appreciable distance in the front or rear. Not only this, but should, by any accident, a prop become dislodged by the pressure against it it would be behind the machine, and therefore not likely to injure the workmen who attend to the machine and who are generally immediately in its rear. At the same time the lateral adjustment which can be given to the trailing bar 14 and to the forward fender enable the guiding of the machine to be regulated and enable the machine to be accommodated to the distance at which the props may be located from the face of the coal; similarly with the fender 24, which acts at the coalface, and which can be adjusted to hold the machine away at any required distance.

What we claim as our invention, and desire to secure by Letters Patent, is—

1. The combination with a coal-cutting machine having a cutting apparatus projecting from one side thereof, means for drawing the machine along the floor of the mine during the cutting operation, and means for maintaining the forward end of the machine at a set distance away from the face of the coal being cut; of a long rearwardly-trailing guide-rod extending from the side of the machine farthest away from the coal-face, means for connecting either end of the trailing guide-rod to the framework of the machine, and means for adjusting the angle of the guide-rod relatively to the line of travel of the machine so that its end may contact with the ordinary props which support the roof of the working only at some distance in the rear of the machine, substantially as set forth.

2. The combination with a coal-cutting machine having a cutting apparatus projecting from one side thereof, means for drawing the machine along the floor of the mine during the cutting operation, and means for maintaining the forward end of the machine at a set distance away from the face of the coal being cut; of a long rearwardly-trailing guide-rod extending from the side of the machine farthest away from the coal-face, means for connecting one end of the trailing guide-rod to the framework of the machine, when traveling in one direction, and for connecting the other end of the trailing rod to the framework when traveling in the other direction, means for adjusting the angle of the guide-rod relatively to the line of travel of the machine so that its end may contact with the ordinary props which support the roof of the working only at some distance in the rear of the machine, and a front fender-bar extending forwardly of the machine on the side opposite to the coal-face, means for connecting the rear end of the fender to the framework of the machine, and means for adjusting the angle of the fender relatively to the line of travel of the machine so that its forwardly-extending end may contact with the side props in the front of the machine, substantially as set forth.

3. In a long-wall coal-cutting machine, the combination with the framework supported upon the floor of the mine, a cutting apparatus projecting from one side thereof, means for drawing the machine along the floor of the mine during the cutting operation parallel with the coal-face, and a fender extending beyond the forward end of the machine next the coal-face to maintain the machine at a set distance from the face of the coal being cut; of a long rearwardly-trailing guide-rod, a bracket on the side of the machine farthest from the coal-face and a pivot-pin to connect either end of the rearwardly-trailing guide-rod to the bracket, according to the direction of travel of the machine, an adjustable thrust-block on the frame of the machine to support the trailing guide-rod at the desired angle relatively to the travel of the machine so that its rear end contacts with the ordinary roof-supporting props at a distance behind the machine, and a front fender extending forwardly of the machine on the side opposite the coal-face to contact with the props in front of the machine, means for pivoting the front fender to the bracket which carries the trailing guide-rod, and an adjustable thrust-block on the framework of the machine to act against the front fender to hold the same at a required distance from the line of travel of the machine, substantially as set forth.

4. In a long-wall coal-cutting machine, the combination with the framework, longitudinal sleigh-runners fixed to the framework to support the latter in its travel upon the floor of the mine, a cutting apparatus projecting from one side of the framework, means for drawing the machine along the floor of the mine, two brackets 25 on the side of the framework next the coal-face, and a fender-bar 24, means for pivoting one end of the said fender-bar to one or other of the brackets 25 so that it extends out beyond the end of the machine in the direction of its travel, two thrust-blocks carried one at each end of the framework and adjustable toward and away from the coal-face one or other of the thrust-blocks being calculated to govern the angle of the fender 24 relatively to the line of travel of the machine; of a long rearwardly-trailing guide-rod, means for connecting one end of the said rod to the framework on the side opposite to the coal-face when traveling in one direction, and for connecting the other end of the trailing rod to the framework when traveling in the other direction, means for adjusting the angle of the trailing guide-rod relatively to the travel of the machine so that its end may contact with the roof-supporting props only at the rear of the machine, and a front fender extending forwardly of the machine on the side opposite the coal-face, means for connecting the rear end of the latter fender to the framework of the machine, and means for adjusting the angle of the said fender, substantially as set forth.

5. In a long-wall coal-cutting machine, the combination with the framework, a cutting apparatus projecting from one side thereof, means for drawing the machine along the floor of the mine during the cutting operation, and means for maintaining the forward end of the machine at a set distance away from the face of the coal being cut; of a bracket 15 fixed to the framework on the opposite side of the latter to the coal-face and about centrally of the said framework, a pivot-pin 20 carried by the bracket, a long rearwardly-trailing guide-rod 14, having a perforation at each end of the said guide-rod adapted to pass over the pivot-pin of the bracket 15 so that the guide-rod can be attached thereto at one end or the other according to the direction of motion of the machine, a fender-rod 23, having a perforation at the end of the said rod to take over the pivot-pin of the bracket 20 so that the fender 23 extends forwardly of the machine to act against the props, and two thrust pins and blocks each capable of adjustment at right angles to the longitudinal axis of the framework one being carried at each end thereof to act respectively upon the rearwardly-trailing guide-rod 14 and upon the fender-rod 23, substantially as set forth.

6. In a long-wall coal-cutting machine, the combination with the framework, longitudinal sleigh-runners fixed to the framework to support the machine upon the floor of the mine, a horizontal wheel projecting from one side of the framework, a bracket extending therefrom to support the vertical axis of the wheel, sets of cutting-tools carried upon the periphery of the said cutting-wheel, a cable-winding drum carried by the framework and operated by mechanism thereon for drawing the machine along the floor of the mine, and a fender 24 extending beyond the forward end of the machine to maintain the same at a set distance from the face of the coal being cut; of a long rearwardly-trailing guide-rod, a bracket on the side of the machine farthest from the coal-face, and a pivot-pin to connect either end of the rearwardly-trailing guide-rod to the bracket according to the direction of travel of the machine, an adjustable thrust-block on the frame of the machine to support the trailing guide-rod at the desired angle relatively to the travel of the machine so that its rear end contacts with the ordinary roof-supporting props at a distance behind the machine, and a front fender extending forwardly of the machine on the side opposite the coal-face to contact with the props in front of the machine, means for pivoting the front fender to the bracket which carries the trailing guide-rod, and an adjustable thrust-block on the framework of the machine to act against the front fender to hold the same at a required distance from the line of travel of the machine, substantially as set forth.

WILLIAM EDWARD GARFORTH.
RICHARD SUTCLIFFE.
WILLIAM BUXTON.

Witnesses:
JOHN JOWETT,
VANCE E. GALLOWAY.